(12) United States Patent
Polcha et al.

(10) Patent No.: US 8,170,037 B2
(45) Date of Patent: May 1, 2012

(54) DEVICES AND METHODS FOR A VIRTUAL INTERNET PROTOCOL TELEVISION (VIPTV)

(76) Inventors: Andrew J. Polcha, Lovettsville, VA (US); Michael P. Polcha, Lovettsville, VA (US)

( * ) Notice: Subject to any disclaimer, the term of this patent is extended or adjusted under 35 U.S.C. 154(b) by 202 days.

(21) Appl. No.: 12/470,483

(22) Filed: May 21, 2009

(65) Prior Publication Data

US 2009/0316709 A1 Dec. 24, 2009

Related U.S. Application Data

(60) Provisional application No. 61/071,843, filed on May 21, 2008.

(51) Int. Cl.
*H04L 12/28* (2006.01)
*H04L 12/50* (2006.01)
*H04N 7/16* (2006.01)
*G06F 15/16* (2006.01)

(52) U.S. Cl. ........ 370/401; 370/382; 370/389; 709/204; 725/148

(58) Field of Classification Search .......... 370/310–338, 370/392–395, 466–474; 709/201–219; 725/56–74, 725/110–119
See application file for complete search history.

(56) References Cited

U.S. PATENT DOCUMENTS

| | | | |
|---|---|---|---|
| 7,072,950 B2* | 7/2006 | Toft | 709/219 |
| 7,161,934 B2* | 1/2007 | Buchsbaum et al. | 370/382 |
| 7,500,261 B1* | 3/2009 | Myers | 725/105 |
| 7,570,637 B2* | 8/2009 | Serbest et al. | 370/389 |
| 7,640,301 B2* | 12/2009 | Walter | 709/204 |
| 2006/0015928 A1* | 1/2006 | Setty et al. | 725/148 |
| 2007/0083908 A1* | 4/2007 | McCarthy et al. | 725/112 |
| 2007/0192798 A1* | 8/2007 | Morgan | 725/51 |
| 2008/0040755 A1* | 2/2008 | Collet et al. | 725/74 |
| 2008/0066131 A1* | 3/2008 | Chang et al. | 725/113 |
| 2008/0098450 A1* | 4/2008 | Wu et al. | 725/132 |
| 2008/0198781 A1* | 8/2008 | Rajakarunanayake et al. | 370/310 |
| 2009/0113505 A1* | 4/2009 | Yu | 725/114 |

* cited by examiner

*Primary Examiner* — Man Phan
(74) *Attorney, Agent, or Firm* — Doster Greene, LLC

(57) ABSTRACT

A communication system according to various exemplary embodiments can include a broadcast station. At least one encoder can be coupled to the broadcast station, wherein the at least one encoder is configured to encode in real-time signals generated from the broadcast station and to convert the signals into Transmission Control Protocol/Internet Protocol (TCP/IP) data packets. At least one server can be coupled to the at least one encoder for transmitting the TCP/IP data packets over a virtual connection between the at least one server to a content distribution network.

19 Claims, 9 Drawing Sheets

Deploy Configuration: User Profile

Configuration Details | Email Options

Deploy Configuration for

Andrew Polcha

Company Name: Planet Web TV

700

☐ User IP set by DHCP

710

| WAN Login | wy562J%Rn1$bfSZ |
| WAN Password | "ht$sQ6vF4#o0zIP: |

730

| GatewayIP: | 192.168.2.1 |
| WANIP: | 69.3.0.33 |
| DNSIP: | 64.105.159.250 |
| DNS2IP: | 64.105.199.74 |
| WINSIP: | 192.168.2.14 |
| WINS2IP: | 192.168.2.15 |

User ID: 8

Verification String: 1234567890

UserEmail: apolcha@plantwebtv.com

Operating System: WindowsXP ▽

720

| WAN Login | 8hTI$c8Lo*nbfE5& |
| WAN Password | 7tf$5dSC7Jnl185g& |

Network Type: Microsoft ▽

Server Type: DomainController ▽

Domain: VPNS

IP Assignment Type: RouterDHCP ▽

IP Type: Private ▽

Deploy Configuration
⦿ Email Config Exe
◯ Write Config Exe to Disk

[ Deploy ]

Figure 7

DEVICES AND METHODS FOR A VIRTUAL INTERNET PROTOCOL TELEVISION (VIPTV)

REFERENCE TO RELATED APPLICATION

This application claims priority of U.S. Provisional Patent Application Ser. No. 61/071,843, which was filed on May 21, 2008. The subject matter of the earlier filed application is hereby incorporated by reference.

FIELD OF THE INVENTION

The present teachings relate to devices and methods for providing a pay television subscription service offering high quality streaming video over an Internet-based Virtual Private Network.

BACKGROUND OF THE INVENTION

Traditional digital broadcast television can be delivered to subscribers using a variety of systems. For example, compressed digital video can be delivered to subscribers using a variety of media, including coaxial cable, fiber optic cable and satellite links. Cable television systems, digital satellite television systems, and telco video services each employ content delivery models that involve aggregation of programming content from multiple content providers and delivery of the aggregated programming content to subscriber premises.

In traditional television broadcasts 100, as illustrated by way of example in FIG. 1, first, the broadcast is created. The broadcast includes at least one or more information signals containing a plurality of television programs which may be selected from a multitude of television programs produced and broadcast from all around the world. Cable systems often receive from satellites the signals they then send through the wires of the cable network. The signals are sent into space to a satellite, converted to a different frequency, and transmitted back to earth to the local cable networks serving each area. Within these service areas, many miles of wire of the cable networks are installed with other utility services such as phone and electricity either underground or on utility poles. Such connections provide cable outlets from the private cable network to residential or business consumers. To access the private network of the cable television services, the consumer must subscribe to the cable company which will then connect the consumer to its private network via the coaxial cable and connected equipment such as a set top box. Televisions are designed to accept signals only from the point of connection to the cable or antenna.

In cable television systems, content is aggregated at a local or regional head end and is retransmitted to subscribers within the regional or local market. The head end is the control center of the cable television that processes the satellite signals in combination with the signals from the local television stations. The head end then transmits or relays the television signals to endpoint nodes within the provider's private network. Finally, these signals are relayed into consumers' homes through the extensive private network of the laid wires/cables called the "last mile." The last mile of the communication network links a residential or business consumer to the network. Due to the inherent privacy and proprietary nature of the last mile network, service providers can be confident that digital content delivered directly to their customers is reasonably free from tamper and interceptions. This inherent security that the last mile provides has been vital to the operation of cable television services, and has been the reason that natural monopolistic conditions have and continue to exist. These natural monopolist conditions create a barrier to open competition in the cable television service marketplace.

Current cable television services, as well as terrestrial broadcast television, have the same content sent continuously to all consumers' homes. The consumer "tunes" a specific television program (channel) at the endpoint either the television or set top box. It is to be noted that, when comparing different traditional networks, different components of each network may be identified as the endpoint. For example, for terrestrial television, the antenna may be identified as the endpoint. For cable television, the set top box may be identified as the endpoint.

In recent years, the landscape is changing dramatically as both residential and business customers demand more and more bandwidth for a growing number of services including high-speed Internet access and video, as well as voice. This increasing consumer demand combined with government deregulation has allowed Telcos as well as cable companies to compete to provide identical services to the consumer. Traditionally, cable companies have provided PayTV services. Telcos have provided voice and Internet services, as a result both last mile type providers (cable and Telco) have positioned their networks to offer triple play offerings within their IP based private networks. As shown in the example in FIG. 2, Telcos and cable companies 200, such as AT&T and VERIZON are vying to provide "triple play services" (voice, data, and video) to their customers in order to compete with the services provided by cable and satellite operators.

Service providers are taking advantage of an emerging IP-based technology, called Internet Protocol Television (IPTV) 110 (shown by way of example in FIG. 1), to offer video services and compete with the cable and satellite television services. IPTV describes a system capable of receiving and displaying a video stream encoded as a series of Internet Protocol packets. IPTV enables television programming to be available whenever each individual consumer demands it. IPTV in delivery is similar to how information on the Internet can be downloaded and viewed. The promise of IPTV is that it will enable carriers to bundle and deliver TV, video signals, or other multimedia services to the residential or business consumer via existing broadband connections, instead of being delivered through traditional broadcast and cable formats. Using IPTV systems can bundle IPTV with Internet services and deliver broadband video services to subscribers over last mile technologies, such as Digital Subscriber (DSLs).

It may be desirable to provide an "over-the-top" (over-the-top of a high speed Internet/broadband) pay TV subscription service offering high quality streaming video over an Internet-based Virtual Private Network. It also may be desirable to provide direct services to the consumer, wherein the IPTV service delivers premium quality of service (QoS) and quality of experience (QoE) to the subscriber along with total endpoint control. In contrast, traditional systems have required the installation and maintenance of a private distribution network and required some forms of hardware-based set top box to provide endpoint control, as discussed above.

It may also be desirable to provide a service that breaks the barriers of the last mile by delivering content over the public Internet as an always-on, quality, video subscription services and that manages the consumer experience with its proprietary software/virtual set top box (VSTB). For example, it may be desirable to provide a VSTB that leverages VPN and DRM (Digital Rights Management) technologies (coupled to a video decoding capabilities) making a safe and private connection for each consumer. It may also be desirable to embed security to any form of content (even premium real-time video). Another example is that it may be desirable for the VSTB to allow for value-enhanced services such as on-demand content, shopping, gaming, and demographically targeted advertisements.

SUMMARY OF THE INVENTION

The present invention may satisfy one or more of the above-mentioned desirable features. Other features and/or aspects may become apparent from the description which follows.

A communication system according to various exemplary embodiments can include a broadcast station. At least one encoder can be coupled to the broadcast station, wherein the at least one encoder is configured to encode in real-time signals generated from the broadcast station and to convert the signals into Transmission Control Protocol/Internet Protocol (TCP/IP) data packets. At least one server can be coupled to the at least one encoder for transmitting the TCP/IP data packets over a virtual connection between the at least one server to a content distribution network.

A communication system according to various exemplary embodiments can include a Virtual Private Network (VPN) tunnel and a private network coupled to the VPN tunnel. A server in the private network can establish communications in the private network, wherein the server is configured to control incoming and outgoing connections, to control network traffic, and to accept VPN traffic from a plurality of incoming transmissions transmitted through the VPN tunnel such that the VPN traffic is piped to a client through at least one streaming server.

A computer implemented method for dynamically configuring software of a remote electronic device; building a configuration package to reconfigure settings and parameters of a node on the Internet; compiling baseline code with a specific client endpoint data to dynamically configure a node on the Internet such that the node is an active node of a private network; compiling WAN credentials within the configuration package to create a specific client dialer, wherein the specific client dialer initiates the endpoint to connect to the private network; compiling LAN credentials into the configuration package; deploying the configuration package to the remote computer; and executing the executable program on the remote computer for reconfiguration to connect the endpoint directly to the private network and managed services via a VPN connection.

A communication system according to various exemplary embodiments can include a broadcast station and at least one encoder coupled to the broadcast station, wherein the encoder is configured to encode in real-time signals generated from the broadcast station and to convert the signals into Transmission Control Protocol/Internet Protocol (TCP/IP) data packets. At least one server can be coupled to the at least one encoder for transmitting the TCP/IP data packets over a virtual connection between the at least one server to a content distribution network, wherein the virtual connection comprises a Virtual Private Network (VPN) tunnel and the content distribution network comprises a private network coupled to the VPN tunnel. The server can be configured for establishing communications in the private network and for controlling incoming and outgoing connections, to control network traffic, and to accept VPN traffic from a plurality of incoming transmissions transmitted through the VPN tunnel such that the VPN traffic is piped to a client through at least one streaming server. A compiler module included in the private network for bundling network settings into an executable application to build a configuration package to dynamically reconfigure settings and parameters of a node on the Internet such that the node is an active node of the private network.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 7 depicts a screen display of a deploy configuration employed to build a configuration package in accordance with the present teachings;

DESCRIPTION OF THE EMBODIMENTS

Figure 1:
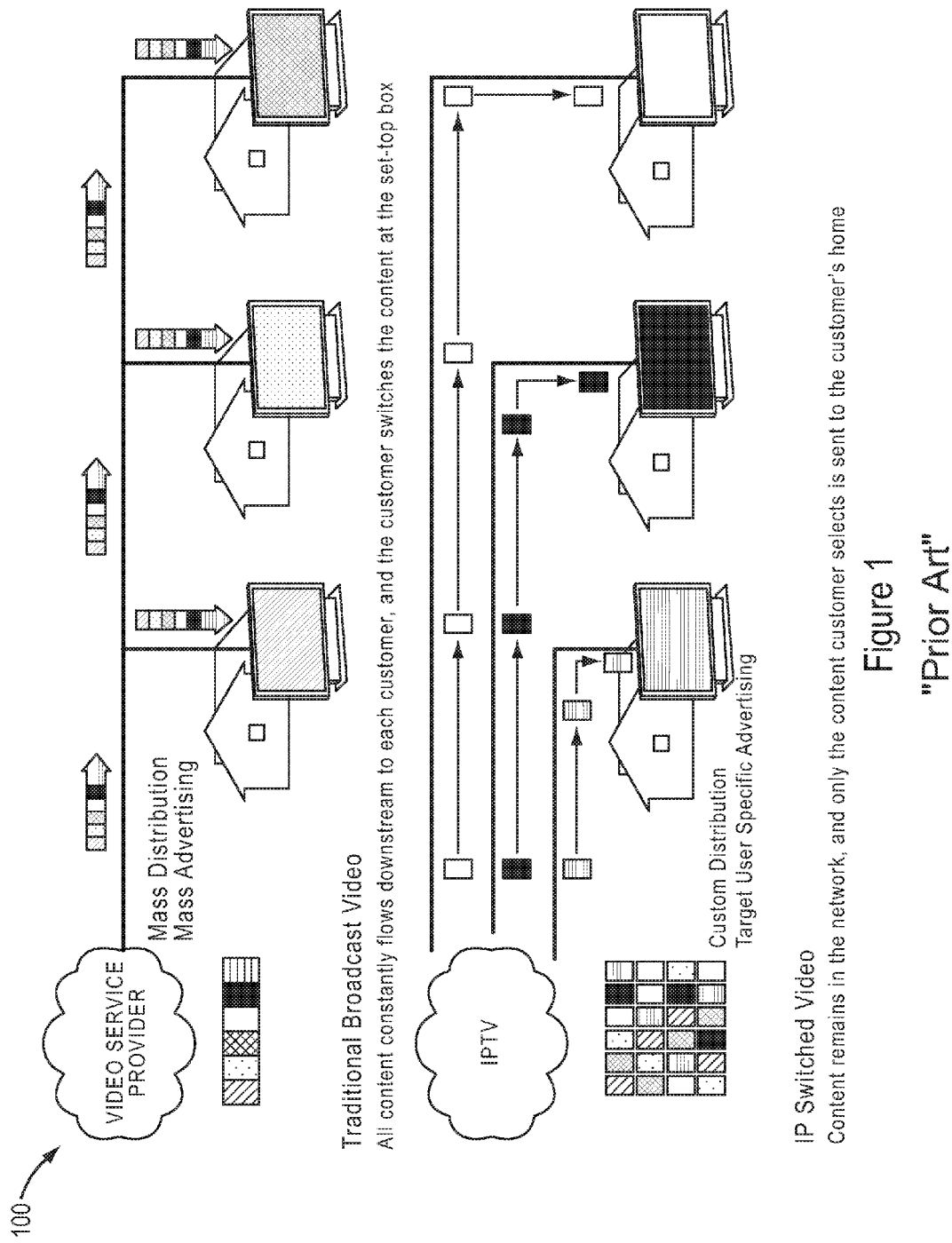
FIG. 1 illustrates communication networks of broadcast stations.
Figure 2:
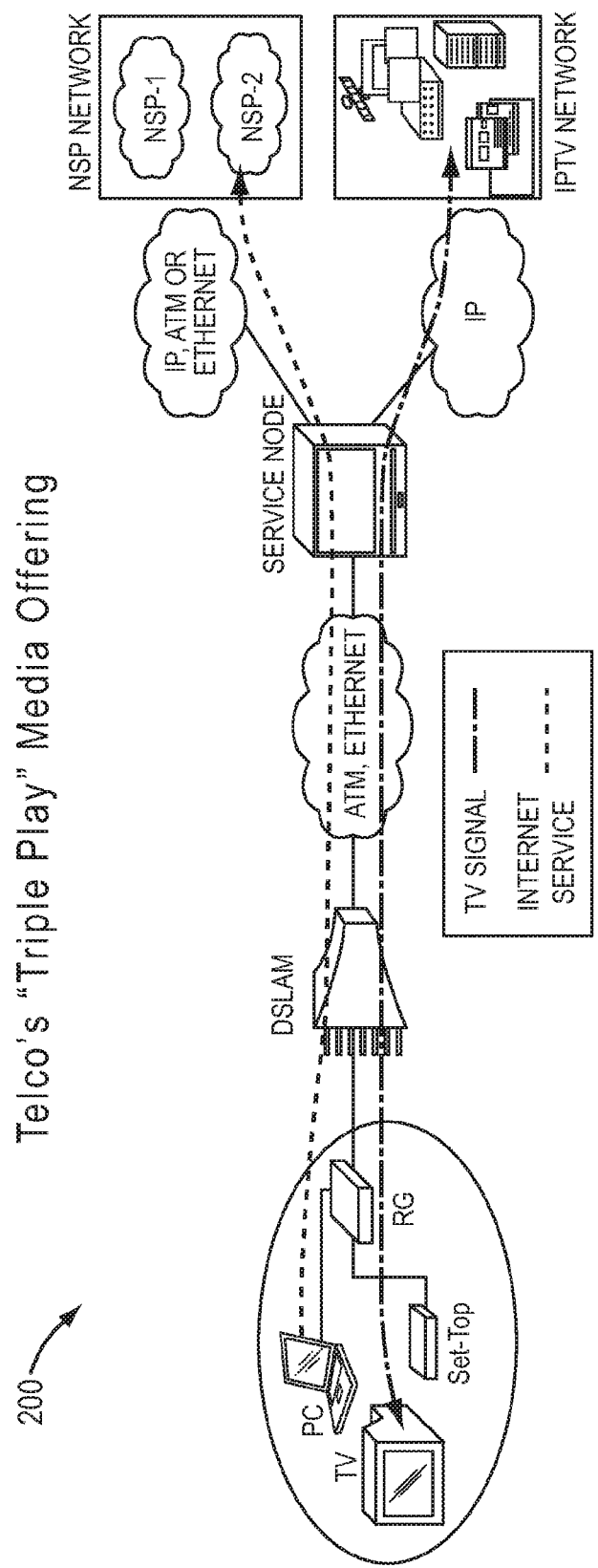
FIG. 2 illustrates a communication network of Telcos and cable companies.

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a", "an", and "at least one" are used interchangeably in this application.

Various embodiments of the method and apparatus described herein provide an "over-the-top" (over-the-top of a high speed Internet/broadband) pay TV subscription service offering high quality streaming video over an Internet-based Virtual Private Network, as a Virtual Internet Protocol Television (VIPTV). Various embodiments provide direct services to the consumer, wherein the VIPTV service delivers premium quality of service (QoS) and quality of experience (QoE) to the subscriber along with total endpoint control, without requiring the installation and maintenance of a private distribution network and a form of hardware-based set top box to provide endpoint control, as discussed above.

Various embodiments of the VIPTV provide a service that breaks the boundaries of the last mile by delivering content over the public Internet as an always-on, quality, video subscription services and that manages the consumer experience with its proprietary software/virtual set top box (VSTB). For example, the VIPTV may provide a VSTB that leverages both VPN and DRM technologies (coupled to a MPEG-4 decoding viewer) making a safe and private connection for each consumer. For example, various embodiments of the VIPTV described herein embed unprecedented security to any form of content (even premium real-time video). In various embodiments, the VSTB provides value-enhanced services such as on-demand content, shopping, gaming, and demographically targeted advertisements.

As will be appreciated by one skilled in the art, the present teachings of the VIPTV may be embodied as a system, method, or computer program product. In various embodiments, the present teachings include various steps, which will be described below. The steps of the VIPTV may be performed by hardware components or may be embodied in machine-executable instructions, which may be used to cause a general-purpose or special-purpose processor programmed with the instructions to perform the steps. Alternatively, the steps may be performed by a combination of hardware and software.

The VIPTV may be provided as a computer program product, or software, that may include a machine-readable medium having stored thereon instructions, which may be used to program a computer system (or other electronic devices) to perform a process according to the present teachings. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other type of medium suitable for storing electronic instructions.

To provide for interaction with a user, the invention can be implemented on a device, such as, a computer system having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or haptic feedback; and input from the user can be received in any form, including acoustic, speech, or haptic input.

The VIPTV may also be practiced in distributed computing environments where the machine readable medium is stored on and/or executed by more than one computer system. In addition, the information transferred between computer systems may either be pulled or pushed across the communication medium connecting the computer systems. In various embodiments, the VIPTV may be described in terms of algorithms and symbolic representations of operations on data bits that may be stored within a memory and operated on by a processor.

Figure 3:
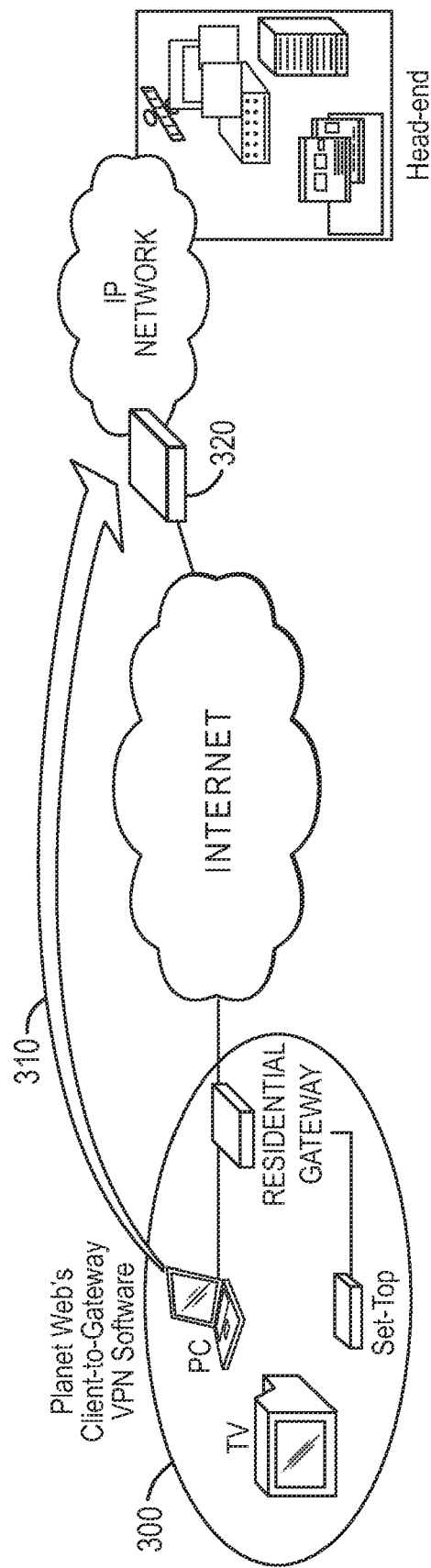
FIG. 3 illustrates a communication network delivering over-the-top TV/video services.

An exemplary embodiment of an VIPTV that can be used, for providing a pay television subscription service offering high quality streaming video over an Internet-based Virtual Private Network, according to the present teachings is illustrated in FIG. 3. FIG. 3 provides a general overview of a VIPTV that may be employed according to the present teachings. In FIG. 3, leveraging existing public Internet Infrastructures (such as residential and/or business Internet connectivity), a logical pipe 310 can be created between a head end 330 and the consumers' end-point 300 via a client to gateway VPN connection 320 to connect, control, and maintain the service offering of Pay-TV service.

As discussed above, traditionally, the component identified within a network as the endpoint depends upon the type of network, and, as advancements were made in the technology to create the next generation of networks, the component identified as the endpoint changed accordingly. In the present teaching, endpoint 300 can be defined as any electrical or electronic device that contains an operating system embedded within. For example, endpoint 300 may be a television, a computer, a set top box, an entertainment system, a video player, a mobile or wireline phone, a personal data assistant (PDA), a navigation system or any combination thereof and may have embedded within an operating system, such as, for example a Windows operating system. Head end 330, according to the present teachings, may include a private IP-based network consisting of a group of video servers, where each server (or a small subset of servers) hosts a dedicated channel within the service offering. Head end 330 distributes and sends signals to all connected nodes that are tuned or connected to receive from a particular IP address to a designated server. Once a connection with endpoint 300 is established, the specific TV channel is sent downstream to the subscriber.

The managed service and logical connection, as illustrated in FIG. 3, can be maintained and controlled by the IPTV Over The Top (OTT) service provider through public infrastructures. An IP VPN can be employed within head end 330 to provide a secure, flexible, and cost-effective means of leveraging IP networks bridging together two points, such as Public TCP/IP v4/6 addresses, through the public Internet. In the case of leveraging VPN connectivity for video distribution, Internet connectivity (with appropriate open Internet ports that support VPN connectivity) may be required at consumers' endpoint 300. The total Internet bandwidth can be shared and divided between the consumers' ISP (Internet connection) and the OTT provider. The client to gateway connection 320 can be a bi-directional connection broadcasting television signal transmitted directly to endpoint 300 through download traffic. The VPN tunnel can be configured as the network segment of the "private network topology" that couples consumers' endpoint 300 to head end 330. The managed service from the OTT provider's perspective can be established and maintained to support all aspects of the VPN connection to endpoint 300.

Figure 4:
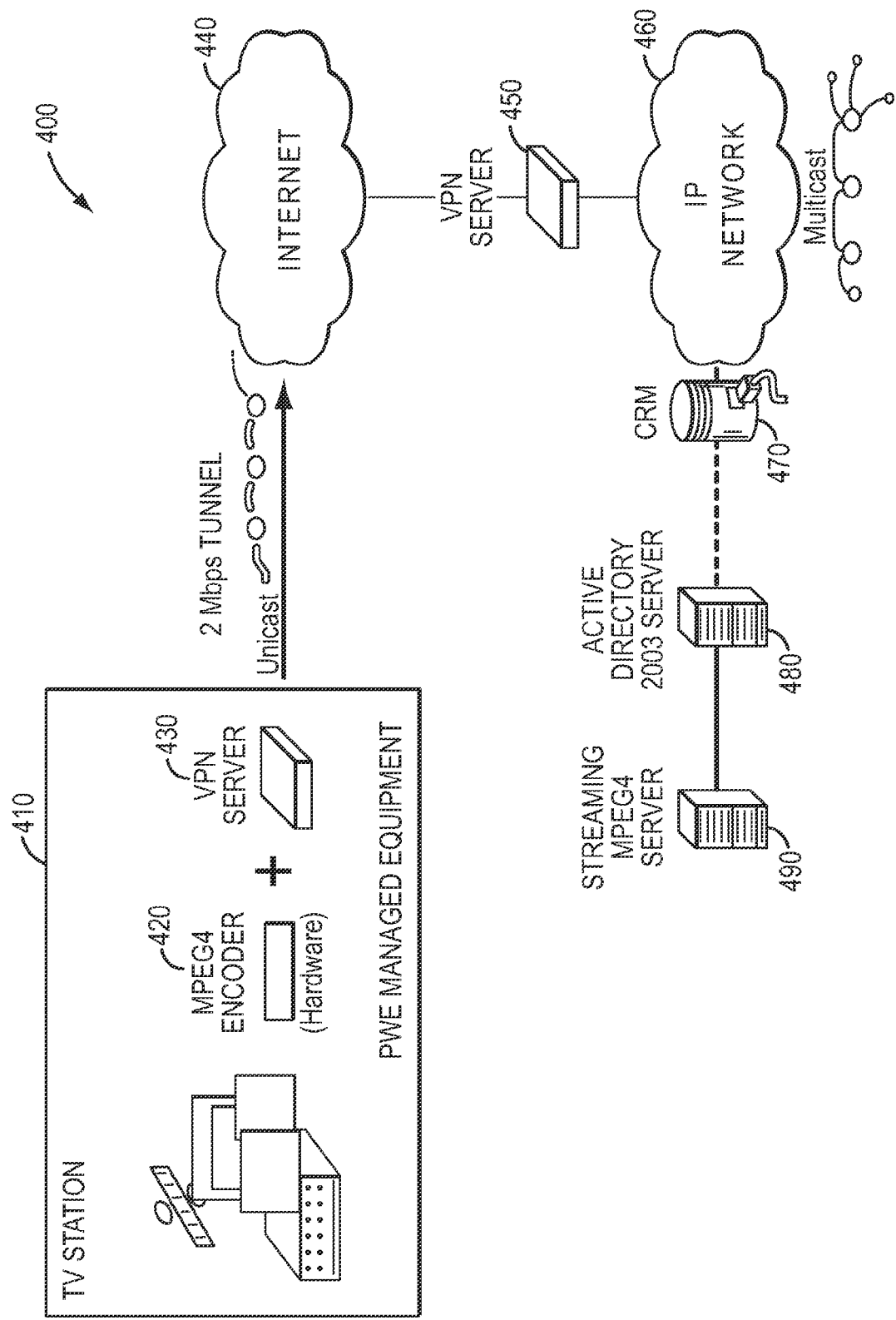
FIG. 4 illustrates a first mile configuration of a communication network in accordance with the present teachings.

FIG. 4 illustrates an exemplary embodiment of a first mile configuration according to the present teaching. In general in FIG. 4, the technologies of the components the system and method can be arranged to transmit media signal from a distant source, such as, for example, TV station 410 having a live feed at a remote location into the OTT provider's topology via a site-to-site VPN connection which can then be distributed to all or a subset of all connected nodes within the private network on the OTT subscription pay television service. Employing exemplary configuration of the first mile according to the present teachings, the system and method can convert a single first mile signal into a mass distribution controlled output (managed service) to all subscribers or a subset of subscribers.

In various embodiments, the configuration of the first mile may include a TV station 410, an encoder 420, and a VPN server 430. TV station 410 can be configured as the media creation/point of origin within the system. At TV station 410, live or taped signal can be encoded using encoder 420 in "real-time" using, for example, a standard format known as H.264/MPEG-4 (Standard Definition [SD] bit rate=250 Kbps-4 Mbps, High Definition [HD] bit rate=4 Mbps-12 Mbps) that allows interoperability between devices within the OTT topology including subscribers' computers. The source signal can be, for example, a continuous series of snapshots with audio delivered by the creation point. Coupled to the TV station's Internet network, encoder 420 can continuously transcode and convert the TV station broadcast output. This output can be transmitted directly to the OTT's private topology via a site-to-site VPN uni-cast tunnel piping 440 which can be connected by a deployed VPN server 430 configured to directly connect to the OTT's provider's private topology 460 via their enterprise gateway server 450. This enterprise gateway server 450 can connect all incoming connections from the public Internet including the first mile connections (site-to-site) as well as client-to-gateway connections from the OTT provider's subscription base of customers. In this embodiment, the connections are a continuous connection and all equipment employed to make the conversions and connection can be managed by the OTT provider.

One feature of the present teaching is that it can be very cost effective to pipe video signals over the public Internet from any point leveraging a VPN technology. One example is that site-to-site requirements of transmission for SD quality are approximately 2 Mbps. Another example is that HD can require connection speeds greater than 4 Mbps. These exemplary parameters for resolution do not include the overhead native to the VPN connection. In FIG. 4, the system can be configured such that the OTT provider 460 is not using the public Internet as the main depot hosting TV signal broadcast—just as a vehicle to distribute and to have access to the public Internet. The OTT provider 460 can host all media content on a private IP network, which the OTT provider manages and controls.

As a signal is transmitted from TV station 410 and received into the private topology 460 using a customer relationship management (CRM) database 470 and a MS active directory 480, it can be directed to a specific TCP/IP address or a group of addresses and allocated to a specific streaming server 490 or a group of servers. These streaming servers 490 can act as a reflector for that particular signal delivered from the remote TV station 410 and can distribute the signal throughout the private network or a subset of connected nodes.

Figure 5:
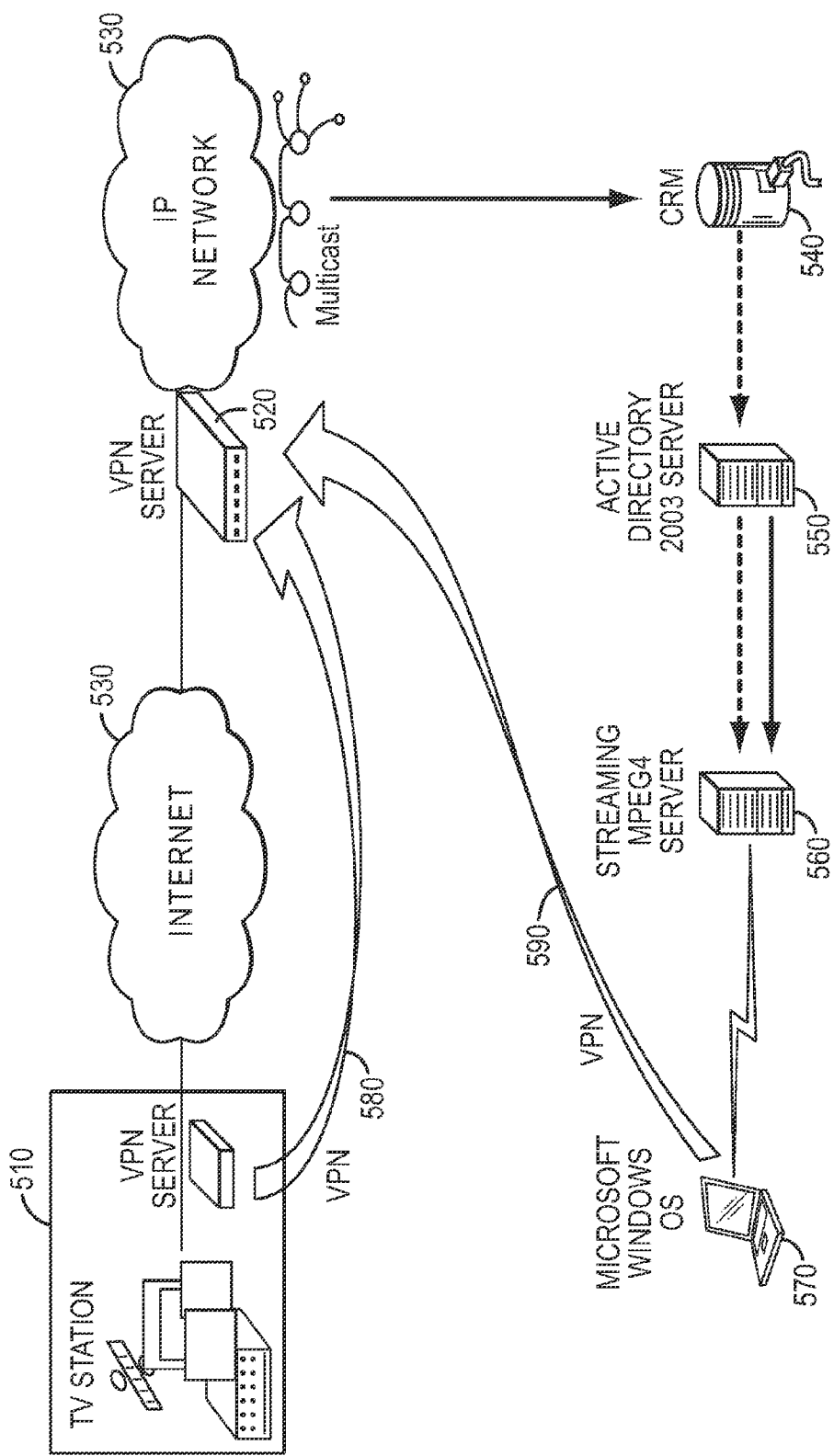
FIG. 5 illustrates a head end transmission of a communication network in accordance with the present teachings.

In various embodiments of the present teachings, for example, as illustrated in FIG. 5, a head end topology operating in a VPN can be configured. In a VPN, a head end device at a central site can be configured to accept traffic from various incoming transmissions. For example, VPN traffic can be transmitted into the head end device through the VPN tunnel and are then piped to the consumers through VPN server/streaming server. Upon arrival, the gateway of the head end typically decrypts the traffic and determines whether it is intended for the central site. If so, the gateway routes the traffic to its final destination in the central site. In the example of FIG. 5, there are varying types of transmissions of communications within the head end topology both representing internal layers 590 of communications (represented with the 7-layer OSI model) as well as external transmissions 580 which interface with the public Internet. One of the main functions of the head end topology is to control the connections at the head end of the OTT provider's private network by establishing and terminating such connections. For example, such connections can be established by connecting a device, (located somewhere on the public Internet), to the same network layer as the OTT provider's private network such as a streaming server 560. The head end topology of the present teachings leverages all the OSI layers and different types of communications such that they work in symphony to create a dynamic, active, seamless connection, and an on-going operability and service management.

In various embodiments, the head end topology may include components such as a VPN server 520, a CRM database 540, an active directory server 550, and a streaming server 560. In some embodiments, the VPN server 520 may be comprised of an enterprise network gateway (ENG), which may be a device that controls both incoming and outgoing connections and traffic network. The ENG may be configured as the connection point for various types of transmission. For example, the ENG can be configured to receive transmissions from both the first mile (site-to-site) connections 580, such as the remote TV station, described in reference to FIG. 4, as well as the gateway accepting incoming connections 590 from a consumer endpoint (client-to-gateway). Although both the public Internet and the private network are IP based in this embodiment, without the ENG, the Internet and the private network are disconnected residing on different layers.

Regarding the first type of transmissions, which can be referred to as the first mile connections 580, the ENG can be configured to enable first mile/site-to-site connections 580 in which a high level of security of that type of connection is of great importance. In various embodiments, the system and method can be configured such that the broadcast from the TV station 510 point of origin is a constant broadcast requiring a constant connection. In such an arrangement, an IPsec based VPN connection can be used as the transmission protocol for securing the site-to-site connections. The IPsec protocol can establish the communication sessions and negotiate the encryption during the sessions. In the some embodiments that employ an IPsec based VPN connection, because the connection between the TV station 510 and the ENG (VPN server 520) can be considered constant, this arrangement constitutes a stationary transmission on the Internet, which can make security breaches from the outside a concern in some situations. One of the reasons to employ IPsec protocol within the first mile connections is to protect the network and thwart such attacks, because the IPsec provides the most secure transfer standardized IP protocol and the highest level of security.

In regards to the ENG's second type of transmission, which can be referred to as the customer connections 590, which are established from the client-to-gateway connection to the consumers' endpoint, this type of connection can be configured such that it is not constant. The system and method are capable and can be configured to be such that the consumer connections are constant. However, in the embodiments wherein the customer connections are not constant, one reason for not employing such a configuration is that most likely there will not be a need or the demand for a constant connection. For example, although possible and the system is capable of providing 24-hour TV viewing capability, it is highly unlikely a consumer would connect or need to be connected to the IP private network to view TV 24 hours a day. Another reason is that the consumers connection may not be configured as constant is that the consumer connections are dynamically assigned, which permit's the use of a more flexible and cost effective security protocol. At the consumer connections, the connections can be established with the ENG when the endpoint (client connection application native to the endpoint) dials the ENG from the public Internet. Consumers' Internet connections and IP addresses are often dynamically assigned and issued by their Internet service providers (ISP). In various embodiments of the present teaching, the ENG can dynamically assign private IP addresses when establishing any client-to-gateway connection. With dynamic IP assignment, likely from both the consumer's ISP and from the ENG, the consumer can be identified as a moving target on both the public Internet as well as the private topology in some embodiments. In other words, the consumer can be considered a moving target within the network because the consumer's location can constantly vary within the network depending upon the consumer's login location within the network. For example, the consumer can travel within the network and log into the network from home, work, or school. For this reason, the dynamic capability provides an additional level of security to the consumer connections such that a less secure protocol can be used rather than the more stringent and secure protocol employed in the first mile connections. Because the consumer is a moving target that can constantly change or vary its login location within the network, this makes the consumer connections more difficult for a computer hacker to locate, constantly monitor, and penetrate such connections. Thus, dynamic IP assignments render the consumer connections less vulnerable to security breaches and attacks.

In various embodiments, the first mile connections can be configured as a constant connection, and the consumer connection can be configured not as a constant connection. In comparison, the first mile connections can be configured as static pipes and secure points that are constantly connected to the network, as described above. The first mile connections can be configured to be secure and impenetrable because this is the point within the network that can provide, for example, mass market distribution of goods and services from an entity and affords the entity the capabilities to control the distribution of its goods and services over the network and the Internet. For example, a production company, such as Disney® or MGM® may wish to distribute the release of its latest movie to all or a select number of its subscribers on the private IP network. To control the distribution and to prevent pirating of the transmission, a more stringent and secure security protocol such as IPsec can be employed in the first mile connections to prevent hackers from copying and pirating the movie. Because of the vulnerability problems and lack of control of distribution by content owners using conventional technologies, in most instances, once the transmission of the content has been compromised and unlawfully copied by others, the owners are no longer able to control or further limit the distribution of the product. Metaphorically, the content owners are not able to put the "genie back into the bottle" and an infinite number of illegal copies can be made and downloaded.

The IPSEC transport protocol, which functions as the security scheme operating at the Internet Layer can be used at the consumer connections, as mentioned above, but in some embodiments more dynamic and flexible protocols such as Layer 2 Tunneling Protocol (L2TP) and Point-to-Point Tunneling Protocol (PPTP) may be better suited for operability with the "unknown" such as network address translation (NAT) and firewalls. Employing the NAT can enable the system and method to masquerade and hide an entire address space consisting of the private network address behind a single public IP address by remapping. For example, the NAT can be implemented in a routing device that uses stateful translation tables to map the hidden addresses into a single address and then rewrites the outgoing IP packets on exit so that they appear to originate from the router. In the reverse communications path, in this example, responses are mapped back to the originating IP address using the rules ("state") stored in the translation tables. In the embodiments directed toward L2TP and PPTP, these protocols may not provide any encryption or confidentiality by themselves and may rely on the encryption protocol that they pass within the tunnel to provide privacy. It is to be noted that the ENG and VPN type transfer protocol leveraged from any type of connection can be used to support the Internet Group Management Protocol (IGMP) multicast protocol employed within the IP network 530. Examples may include IPsec, L2TP, PPTP and Secure Sockets Layer (SSL) type of connections over IPv4/v6, as well as Transmission Control Protocol (TCP) or User Datagram Protocol (UDP) ports.

The IP network 530 shown and described in FIG. 5 can be configured as a private IP network that is closed within an organization and connects to a public network such as the Internet via a firewall. The closed organization may be, for example, a university, business, government or any other enterprise. Further, the IP network can be configured as an IP based topology that uses a private IP address space (RFC 1918 and RFC 4193 standards). By incorporating VPN connectivity, this topology provides a private virtual LAN (VLAN), wherein the VLAN is a group of hosts with a common set of requirements that communicate as if they were attached to the Broadcast domain, regardless of their physical location. The VLAN can be designed having the same attributes as a physical LAN, but it allows for end stations to be grouped together even if they are not located on the same network switch. In the exemplary embodiment of FIG. 5, the IGMP protocol is implemented within the IP network 530 for more efficient use of attached resources when supporting real-time video distribution and networked gaming services. The IGMP can be used by both the client computer (endpoint) and the adjacent network switches (ENG) to connect the client to a local multicast router. Protocol Independent Multicast (PIM) can then be used between the local and remote multicast routers, to direct multicast traffic from the video server to many multicast clients attached via a connected VPN tunnel. Although the private IP network 530 in FIG. 5 has been described in use with the IGMP, the IP private network is not limited to use the protocols and data transmissions methods described herein. Rather, other communication protocols can be employed within the private network as long as it can provide a multicast protocol that is capable of switching channels. In contrast to the present teachings, in a traditional cable television network, channel switching is performed by configuring all channels so that they are always "present" on the wire in the service delivery. Channel switches occurs when a set-top box tunes a specific frequency (i.e., channel) on the entire delivered spectrum of channels. In the case of switching channels in an IPTV network such some embodiments of the present teaching, the endpoint selects a channel which is represented as a dedicated server on the head end. Each channel can be assigned an IP address on the private network. Movement from one channel to another can be performed by selecting to receive a signal from a dedicated scope of servers hosted on the private multicast network. From the consumer's perspective, the direct connection of the endpoint to the channel's server is tuning and viewing the channel such that the consumer is afforded the ease and the appearance of switching, for example, TV channels, similar to traditional TV channel switching but using a different methodology.

In general in FIG. 5, the CRM database 540 can be configured as the main depository of information which stores, maintains, and updates all statistical data of all incoming and outgoing connections, all customer account information, as well as all device settings within the private topology's framework. One of the main functions of the CRM database 540 is to archive data as a database management system, but in some embodiments, the CRM 540 can also function as a device manager within the connected private topology and as a deployment manager (connection manager) for all internal and external connecting endpoints. A more detailed description of the CRM database 540 is provided below.

The components within the private topology can be configured as an integrated network such that it integrates features and services of various components. Each component can be designed to perform certain functions and to interface and interact with other components. The components can be configured to conform and operate on a platform common to all components within the topology. Multiple components may be assembled together to build other components, and a component can be built by integrating pre-existing components. For example, the CRM can be configured to be integrated with existing network hardware and software configuration applications such as the configuration consoles of the ENG and the Active Directory 550 components. Because both the ENG and Active Directory are network components, they can be configured to require similar or complementary information about a native topology. For example in various embodiments, the ENG primarily can require information and configuration of Wide Area Network (WAN) profiles for proper operability of incoming connections from the public Internet. The WAN profiles within the ENG may provide the operational settings for each node attached to the public Internet (TV station/endpoint) via configuration files that are read during startup.

In FIG. 5, The Active Directory 550 can be configured as a network technology that provides a variety of services and allows objects within a network to be assigned permissions, policies and parameters of operability. In various embodiments, user accounts within Active Directory can grant or limit access to various resources and objects within the private topology such as a streaming server hosting specific television channel or gaming system. The CRM database 540 can interface with and control the Active Directory 550 so that data such as a consumer's billing information or service selection can be matched and configured to control the specific operability and functionality of any consumer's endpoint when attached to the private topology. By way of example, if a customer wants to order the HBO® channel but does not want to receive any transmission of the cartoon channel, the Active Directory 550 can specify the access of any individual endpoint to network objects within the private framework.

Because both the ENG and the Active Directory 550 can be configured to reside on the same layer of the private network, it is possible for the CRM database 540 to directly control the configuration consoles of both components with the use of custom configuration scripts of scripting language or program script extensions. As mentioned, the CRM database 540 can contain data within its various database indices pertaining to the endpoint. Custom program scripts can be applied to match field-to-field binary settings and configurations in creating the WAN profiles on the ENG and assign the rights to access streaming servers or network object within the Active Directory 550 configuration consoles.

The streaming server 560 in the embodiment of the private topology in FIG. 5 can be configured to function as a reflector for the first mile television station. Streaming delivers media from a server over a network to a client in real time. With streaming, in the present teachings, no file is ever downloaded to a viewer's hard drive and media is played and viewed by the client as it is delivered. Thus, no file is downloaded or stored within a local buffer. In contrast, in some conventional on-demand streams are downloaded and stored in buffers or servers for a period of time and are available to be replayed and viewed at a user's request. However, when the content (or a small portion of content) is downloaded to the endpoint and stored even briefly in a cache of a buffer of a video player, for example, the movie is rendered locally first in, first out (FIFO). It is the system's cache point which is a vulnerable point of attack for theft where the content owner loses control over the content and it becomes susceptible to attack. Rather, the present teachings provide real-time, live streaming wherein no files are downloaded and stored locally. The streaming server 560 can transmit video and audio streams to individuals in response to requests made from a client and are handled using Real-Time Transport Protocol (RTP), which is a transport protocol used for transmitting real-time multimedia content. The Active Directory 550 can grant or limit access to any endpoint to a streaming server while connected via the VPN server 520.

In various embodiments, the CRM database 610 can be configured to perform at least two roles or serve dual functions for providing seamless operability of the OTT managed service. Regarding the first function, the CRM 610 can be configured to be the storage point for all binary network device settings of the private topology. It may be necessary for the CRM to store the settings for the global devices within the topology in order to control the devices within the topology. This network configuration and set-up process can include all network device settings encompassing all devices that make up source configurations, all endpoint configurations and connections as well as the ENG and all user accounts within the network's Active Directory/LDAP server. Regarding the second function, the CRM 610 can be configured to serve as the direct device control and management. The device control feature can consist of two different forms of device management for both devices contained and managed within the private topology (ENG and Active Directory) and endpoint devices connecting through from the public Internet. Both the private topology of the OTT service and the public Internet can be IP based networks, but they can reside on completely different layers within the OSI communication model. For seamless operability, the CRM can be configured to control devices attached to both network layers. To achieve this, functional device management can be deployed in at least two different forms to bridge the devices from one layer (private topology) to the other (the public Internet).

To provide CRM device control within the private topology, the two main components dynamically controlled and managed can be the ENG and the Active Directory/LDAP discovery service. The CRM 610 can serve as a storage depository for all binary network settings and configurations. In various embodiments because the CRM physically resides on the same layer as the ENG and the server containing Active Directory, it is possible to use scripting programs to control the management consoles' of both network components. Custom "field-to-field" (CRM-to-device management console) control functions can be scripted to update each type of device in either a session or application based communication described on the OSI model. In regards to the CRM's control of the ENG, field-to-field scripting from an appropriate index within the CRM can be programmed to create and manage WAN profiles by the ENG's management console for accepting incoming connections from the Internet (source and endpoint).

Figure 6:
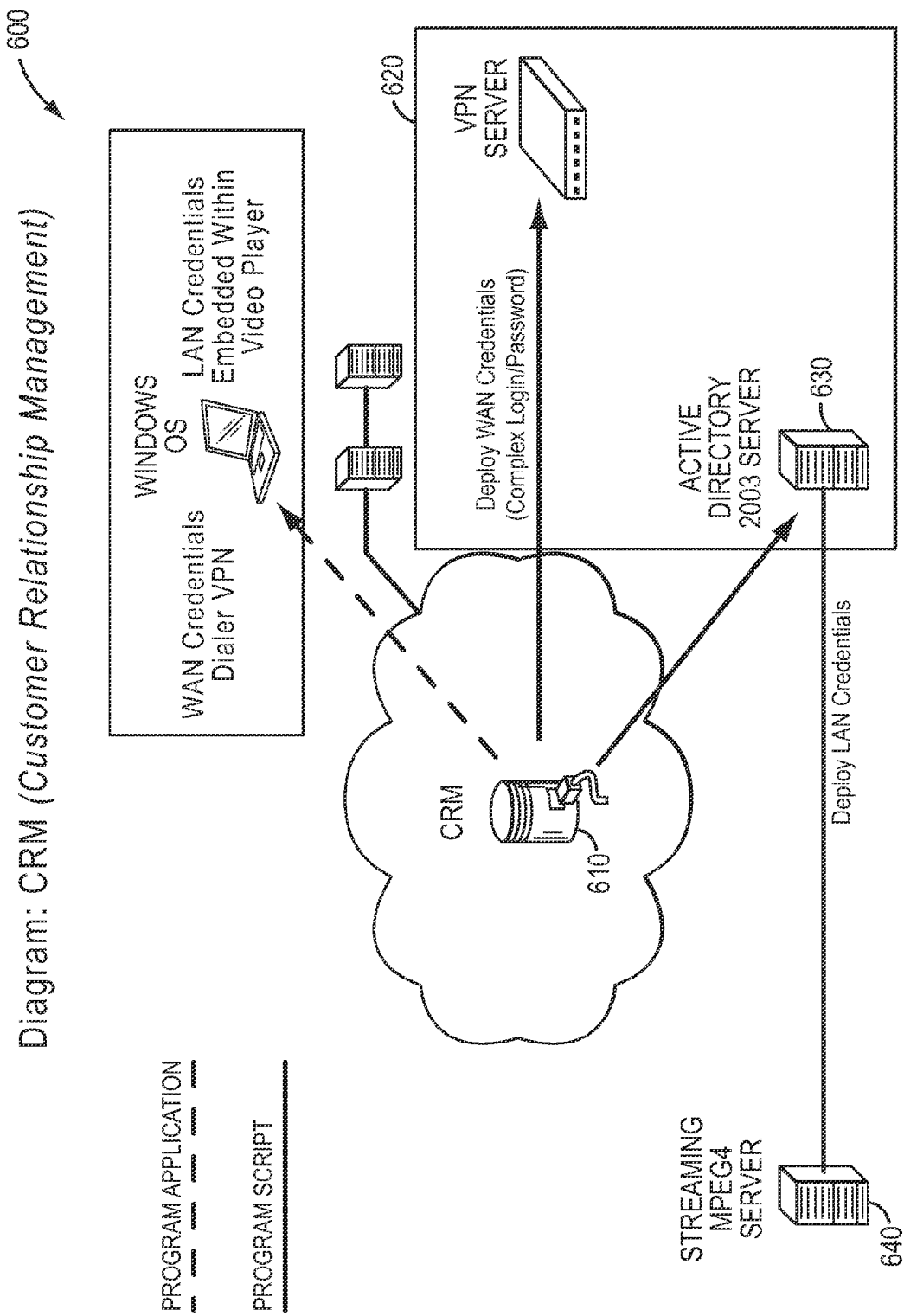
FIG. 6 illustrates a customer relationship management of a communication network in accordance with the present teachings.

Regarding the CRM's control of the Active Directory, as represented by box 620 in FIG. 6, scripting can create, manage and update all user data (LAN credentials) for operability within the private topology. Binary information from the CRM can create LAN based accounts on the network and can assign appropriate "rights and permissions" for access to various components to those accounts. To Active Directory 630, each streaming server 640 can serve as a network resource or network "object" to grant or reject access. Each endpoint can be configured as a unique "user" on the network. Active Directory 630 can be designed as the mechanism within the system that makes the internal access user assignments and manages that those policies within the private topology.

For seamless end-to-end operability, one of the technical tasks is to dynamically configure the remote point, representing any point on the public Internet, and make it an active node of the private network. This feature of the system is represented by and described in reference to box 650 in FIG. 6. For the service provider, the goal is to simplify the configuration inputs for the consumer and to mitigate connection troubles and security risks for all customers. In various embodiments, the CRM 610 can indirectly control the endpoint with the use of configuration packages targeted for the endpoint. The CRM's second function of device management can be provided in the form of a custom configuration package, which consists of baseline executable code combined with custom endpoint connection data. The connection package's baseline code can be a general configuration tailored for a supported operating system with all the common criteria for network operability. The global connectivity settings for every endpoint can be stored as data within the CRM. When it is necessary to create a new account and activate a new endpoint for service, the unique and specific network settings associated with that account such as logins, passwords, TCP/IP addresses and encryption settings can be combined with the connection package's baseline code by the CRM. The newly configured settings can be compiled into a stand alone application for deployment to the endpoint via email or Internet download.

FIG. 7 illustrates an exemplary display screen depicting a sample of network settings that can be used to build a connection package and provide delivery of on-going management and support for the remote connection of an endpoint device. The CRM can archive and store within a variety of index tables the following exemplary information: topology settings of the private network, WAN credentials associated with every customer account, LAN credentials associated with every customer account, customer billing information and customer service orders (what channels each customer account are configured to have access to). In order to achieve seamless operability, the endpoint can operate in symphony with the two connection elements within the head end, specifically the ENG and Active Directory. In the exemplary screen display of an electronic device illustrated in FIG. 7, the configuration details page can be selected and the requested information entered to specify, distribute, and deploy configuration information to build a connection package. For example, by entering in 700 the customer's name, company name, user ID, verification string, and user e-mail address, a customer's contact and billing information can be entered and stored as a unique account for both services and support purposes. In FIG. 7, another example of configuration information is that the WAN login and WAN password 710 can be scripted to the ENG as it creates a unique WAN profile within the device via the ENG's management console. To make the end-to-end connection, the WAN credentials can also be compiled to create a unique "dialer" within the connection package deployed to the consumer's endpoint. The dialer's function within the connection package can be to initiate the endpoint to connect to the ENG through the public Internet—turning on/off the service. In various embodiments, the WAN connection credentials can be derived from a random number generator producing a strong set of credentials for added security.

Further during the process of specifying the deploy configurations depicted in FIG. 7, the LAN credentials employed can be configured as a two part connection process. A unique set of LAN credentials 720 for the LAN login and LAN password can be generated for each user account within the private topology. With the use of programming code, the CRM can create a seamless connection using the LAN credentials to update a server's Active Directory/LDAP services for user account control and management. A user account can be updated using the CRM to expand and limit accessibility to network resources, account activation and disconnection from the services.

The unique LAN credentials enrolled within Active Directory/LDAP services can establish private network boundaries for the endpoint, "where it can go" and its inherent rights and permissions when connected to the private network topology. In regards to endpoint configuration and management, the LAN credentials for a user account can be stored within the CRM and are compiled into part of the connection package to be deployed for endpoint configuration. The LAN connection credentials can be derived from a random number generator producing a strong set of credentials for added security. In various embodiments, the LAN credentials can be defined to be different from the WAN credentials providing layered access control to the private network. The LAN credentials can correspond directly with the corresponding account residing within the Active Directory/LDAP service. The LAN credentials can be implemented and embedded within a video player or the viewing application for operability at the endpoint. The CRM application output, which is transmitted as the connection package, can be designed to deploy and install multiple applications such as, for example, Internet/WAN dialers, video viewers, gaming consoles, and security certificates, at the endpoint working in symphony with the elements of the private topology.

In FIG. 7 by entering information 730 regarding, for example, the gateway IP address, WAN IP address, DNS IP address, and WINS IP address, network settings of both the public Internet and the private topology can be integrated into a RAS phonebook setting for connecting, for example, any MS Windows based endpoint or a third-party software/hardware VPN client. Integrated as part of the connection package, the network settings can represent connection specifics such as "where the ENG is on the public Internet and what the address of the endpoint is on the private topology". The pre-configured connection package created by a CRM, once installed on the endpoint, reduces much of the human element required to configure both the endpoint and internal resources within the private topology.

Figure 8:
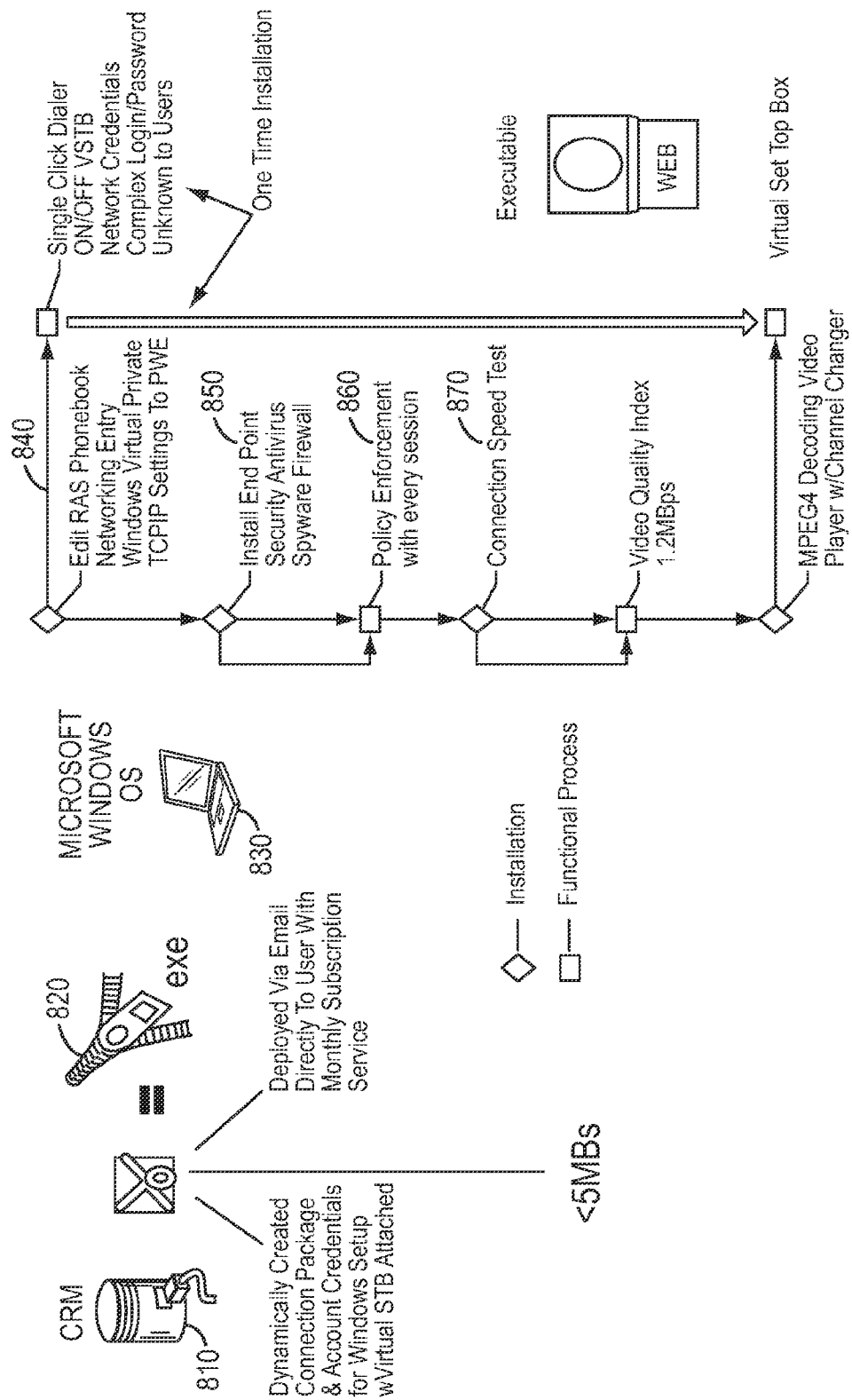
FIG. 8 illustrates a process of building a configuration package in accordance with the present teachings.

As shown in FIG. 8, the endpoint configuration process 800 or the construction of the connection package can be an application or a series of applications, once installed, enables an endpoint to connect directly to a private network and managed service via a VPN connection. The unique customization of the connection package can be created from the network settings and binary data stored within the service CRM database 810. With a compiler module, the CRM can compile the unique network settings into an executable application 820 for deployment either by email or by Internet download. The resulting executable program 820 can be run on a remote computer 830 to configure the remote computer to establish a VPN connection to the host computer. Other applications that can be included to build the connection package can consist of, for example, Windows Remote Access Service (RAS) Dialers, Video viewer applications, gaming consoles, VoIP clients, etc.

In various embodiments, using binary network information stored in the CRM 810, the compiler module can generate an executable file 820 including all of the parameters in a prescribed format. These parameters can include a connection client, with specific network settings, which creates a RAS phonebook entry 840 for an endpoint supporting a Windows operating system. The settings can be comprised of both Internet and private network TCP/IP settings for endpoint connectivity to the private network.

In the example shown in FIG. 8, the executable program 820, when run on a remote computer 830, configures the operating system with the settings necessary to establish a VPN connection to the ENG. According to some embodiments, the RAS phonebook of the Windows operating system is configured with a binary injection of appropriate network settings for connecting to the private network derived from the CRM database. To ensure the endpoint's integrity both for proper functionality of the endpoint as well as integrity of the connecting private network, security features such as antivirus, firewalls, antispyware, and automatic update services 850 may also be installed for endpoint support and control. The endpoint's security status 860 can be assessed by the executable program prior to establishing the connection and the security status can be used as criteria to determine connection fitness of the endpoint system. Endpoints failing to meet the minimum security criteria can be prevented from connecting to the private network effectively protecting other users and network elements contained within the private topology from malicious attacks.

To ensure "Quality of Service" (QOS) of connectivity all the way to the endpoint, an example of additional services or applications contained within the connection package can be an integrated bandwidth speed test 870. The speed test, like the security features, can test the Internet connection of the endpoint each time during service activation to ensure availability of adequate resources and also serve as a required endpoint connection criteria.

In various embodiments, the connection package can leverage internal resources and functionality of the MS Windows operating system. In a similar manner, the connection package can alter and control the RAS or "dial-up networking" of Windows, the connection package can directly control other native frameworks such as Active X, MS DirectX, and/or MS DirectShow. As commonly known, DirectShow is a multimedia framework and API produced by Microsoft® for software developers to perform various operations with media files or streams. Basic player and playback video function controls exist within the Windows OS, the connection package can influence the endpoint's Windows' multimedia API to expand its functionality. The connection package can contain third-party software and capabilities such as RTP filters for channel changing and H.264 decoding filters for video decoding. When a successful connection is established from the endpoint to the ENG, the endpoint becomes an active node of the private network. Services and protocols such as IGMP, SIP, RTP, and RTSP can be sent to the endpoint with custom configured connection packages.

Figure 9:
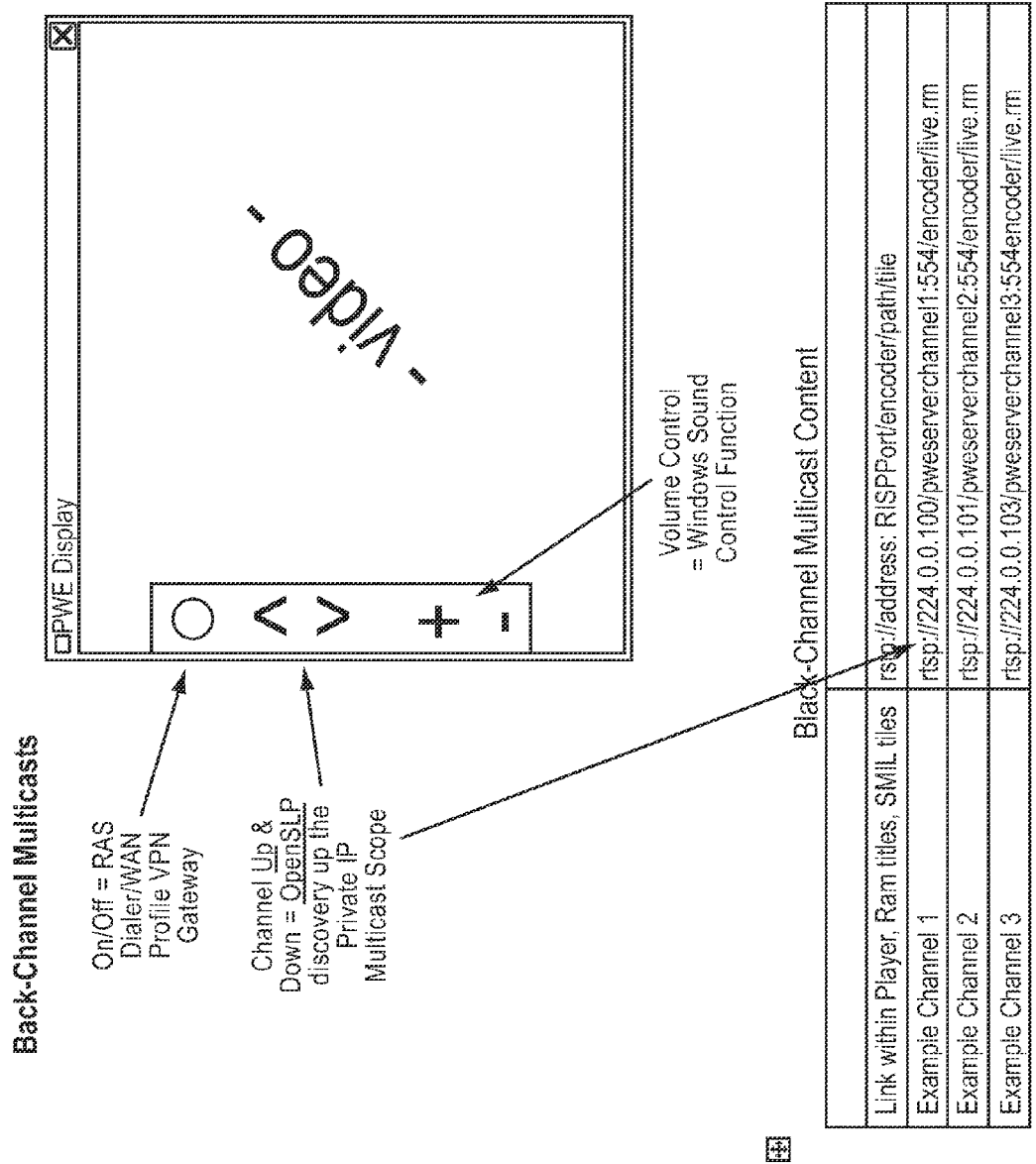
FIG. 9 illustrates a rendition of a configuration package and installation media player operable with a private network in accordance with the present teachings.

The example shown in FIG. 9 is one rendition of a connection package and installation of a media player operable within the private network. The media viewer can include an active window displaying an H.264 video stream leveraging internal Windows resources such as Active X and DirectShow, a third-party H.264 decoding DirectShow filter, as well as a third-party RTSP DirectShow filter. The specific decoding (H.264) functionality and RTSP may not be a native feature of DirectShow. In some embodiments, it may be necessary to include these features within the installation process of the connection package.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communication system, comprising:
   a content distribution network;
   a first mile configuration connected to the content distribution network; the first mile configuration comprising:
      a broadcast station configured to generate media signals;
      at least one encoder coupled to the broadcast station, wherein the at least one encoder is configured to continuously encode in real-time the media signals generated from the broadcast station and to continuously convert the media signals into Transmission Control Protocol/Internet Protocol (TCP/IP) data packets; and
      at least one Virtual Private Network (VPN) server coupled to the at least one encoder for establishing a secure and constant tunneling interface for transmitting the TCP/IP data packets over a VPN uni-cast tunnel connection between the at least one VPN server of the first mile configuration to the content distribution network comprising a private network;
   a gateway server provided in the VPN uni-cast tunnel connection for establishing communications in the private network, wherein the gateway server is configured to control incoming and outgoing connections, to control network traffic, and to accept VPN traffic from a plurality of incoming transmissions transmitted through the VPN uni-cast tunnel to the private network controlled by a database and secured by an active directory coupled to the gateway server; and
   a plurality of streaming servers coupled to the active directory for distributing the TCIP/IP data packets transmitted from the broadcast station to at least one node of the private network.

2. The communication network of claim 1, wherein the broadcast station selected from at least one of a television station, previously recorded media, camera, or live feed.

3. The communication network of claim 1, wherein the VPN uni-cast tunnel connection comprises an Internet Protocol Security (IPsec) based Virtual Private Network (VPN) connection configured as a transmission protocol to detect and mitigate security breaches of the VPN connection.

4. The communication network of claim 1, wherein the broadcast station comprises a television station and the content distribution network comprises a private access network of a Virtual Internet Protocol Television (VIPTV).

5. The communication network of claim 4, wherein the VIPTV provides over-the-top of a high speed Internet pay television subscription service that offers streaming video over an Internet-based Virtual Private Network (VPN).

6. The communication network of claim 1, wherein the content distribution network comprises a uni-cast or multi-cast enabled network that employs at least one of:
  a virtual set top box to provide channel switching capabilities, without requiring use of a hardware-based set top box; and
  an endpoint to provide channel switching capabilities and configured with resources to connect, manage, and control the endpoint as an active node of at least one of a Virtual Private Network (VPN) and the private network.

7. A communication network comprising:
  a content distribution network;
  a first mile configuration connected to the content distribution network; the first mile configuration comprising:
    a broadcast station configured to generate media signals;
    at least one encoder coupled to the broadcast station, wherein the at least one encoder is configured to continuously encode in real-time the media signals generated from the broadcast station and to continuously convert the media signals into Transmission Control Protocol/Internet Protocol (TCP/IP) data packets; and
    at least one Virtual Private Network (VPN) server coupled to the at least one encoder for establishing a secure and constant tunneling interface for transmitting the TCP/IP data packets over a VPN uni-cast tunnel connection between the at least one VPN server of the first mile configuration to the content distribution network comprising a private network:
  a gateway server in the private network for establishing communications in the private network, wherein the gateway server is configured to control incoming and outgoing connections, to control network traffic, and to accept VPN traffic from a plurality of incoming transmissions transmitted through the uni-cast VPN tunnel such that the VPN traffic is piped to a client through at least one streaming server; and
  a compiler module in the private network for bundling network settings into an executable application to build a configuration package to dynamically reconfigure settings and parameters of a node on the public Internet such that the node is an active node of the private network, wherein the compiler module:
    compiles baseline code with a specific client endpoint data to dynamically configure the active node of the private network;
    compiles WAN credentials within the configuration package to create a specific client dialer, wherein the specific client dialer initiates an endpoint to connect to the private network; and
    compiles LAN credentials into the configuration package;
  deploys the configuration package to a remote computer; and
  executes the executable application on the remote computer for reconfiguration to connect the endpoint directly to the private network and managed services via a VPN connection.

8. The communication network of claim 7, wherein the private network comprises a uni-cast or multicast enabled network that employs at least one of:
  a virtual set top box to provide channel switching capabilities, without requiring use of a hardware-based set top box, and
  the endpoint to provide channel switching capabilities and configured with resources to connect, manage, and control the endpoint as the active node of at least one of a Virtual Private Network (VPN) and the private network.

9. The communication network of claim 7, wherein the VPN server comprises a head end device for controlling the connections.

10. The communication network of claim 7, wherein the at least one streaming server comprises a reflector to distribute a signal transmission delivered from a remote TV station throughout nodes of the private network.

11. The communication network of claim 7, wherein the incoming connections comprise traffic from at least one first mile connection and a client-to-gateway connection.

12. The communication network of claim 11, wherein the first mile connection is configured as a constant connection that is constantly connected to the private network, and the client-to-gateway connection is configured as a non-constant connection to the private network.

13. The communication network of claim 11, wherein the gateway server is configured to dynamically assign private IP addresses when establishing a client-to-gateway connection.

14. The communication network of claim 7, further comprising:
  a Customer Relationship Management (CRM) configured as a device manager and a deployment manager; and
  an active directory configured to grant access to resources and objects within the private network.

15. The communication network of claim 14, wherein the CRM combines baseline executable code with custom endpoint connection data to dynamically configure the node on the public Internet such that the node is the active node of the private network.

16. The communication network of claim 7, wherein the at least one streaming server delivers media content from the server over the private network to the client in real time without downloading and storing a file containing the media content to a client local storage device.

17. A method for providing managed services via a Virtual Private Network (VPN), the method comprising:
  providing a broadcast station;
  coupling at least one encoder to the broadcast station, wherein the encoder is configured to encode in real-time signals generated from the broadcast station and to convert the signals into Transmission Control Protocol/Internet Protocol (TCP/IP) data packets;
  coupling at least one server to the at least one encoder for transmitting the TCP/IP data packets over a virtual connection between the at least one server to a content distribution network, wherein the virtual connection comprises a Virtual Private Network (VPN) tunnel and the content distribution network comprises a private network coupled to the VPN tunnel;
  establishing, using the server, communications in the private network and using the server to control incoming and outgoing connections, to control network traffic, and to accept VPN traffic from a plurality of incoming transmissions transmitted through the VPN tunnel such that the VPN traffic is piped to a client through at least one streaming server;
  building a configuration package to reconfigure settings and parameters of a node on the Internet, comprising:
    compiling, using a compiler module, baseline code with a specific client endpoint data to dynamically configure a node on the Internet such that the node is an active node of a private network;

compiling WAN credentials within the configuration package to create a specific client dialer, wherein the specific client dialer initiates an endpoint to connect to the private network;

compiling LAN credentials into the configuration package;

deploying the configuration package to the remote computer; and executing the executable program on the remote computer for reconfiguration to connect the endpoint directly to the private network and managed services via a VPN connection.

18. The method of claim 17, further comprising providing at least one application or services selected from the group consisting of:

(a) security features selected from at least one of antivirus, firewalls, antispyware, and automatic update services;

(b) security status check employed to determine connection fitness of the endpoint, wherein failure to meet a predetermined security criteria prevents the endpoint from connecting to the private network;

(c) quality of service test employing a bandwidth test, which tests the Internet connection of the endpoint during service activation to ensure availability of sufficient resources;

(d) video viewer;

(e) music;

(f) gaming;

(g) E-learning;

(h) Television (TV) program guide; and (i) Voice over Internet Protocol (VoIp) service.

19. A communication system, comprising:

a broadcast station;

at least one encoder coupled to the broadcast station, wherein the encoder is configured to encode in real-time signals generated from the broadcast station and to convert the signals into Transmission Control Protocol/Internet Protocol (TCP/IP) data packets;

at least one server coupled to the at least one encoder for transmitting the TCP/IP data packets over a virtual connection between the at least one server to a content distribution network, wherein the virtual connection comprises a Virtual Private Network (VPN) tunnel and the content distribution network comprises a private network coupled to the VPN tunnel;

wherein the server is configured for establishing communications in the private network and is configured to control incoming and outgoing connections, to control network traffic, and to accept VPN traffic from a plurality of incoming transmissions transmitted through the VPN tunnel such that the VPN traffic is piped to a client through at least one streaming server; and a compiler module in the private network for bundling network settings into an executable application to build a configuration package to dynamically reconfigure settings and parameters of a node on the Internet such that the node is an active node of the private network, wherein the compiler module:

compiles baseline code with a specific client endpoint data to dynamically configure the active node of the private network;

compiles WAN credentials within the configuration package to create a specific client dialer, wherein the specific client dialer initiates an endpoint to connect to the private network; and compiles LAN credentials into the configuration package;

deploys the configuration package to a remote computer; and executes the executable application on the remote computer for reconfiguration to connect the endpoint directly to the private network and managed services via a VPN connection.

* * * * *